Figure 4:
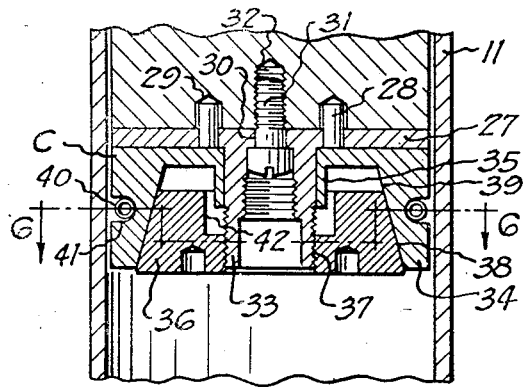

July 13, 1943.  L. C. MILLER  2,324,103
WELL SURVEY APPARATUS
Filed Dec. 19, 1940   2 Sheets-Sheet 1
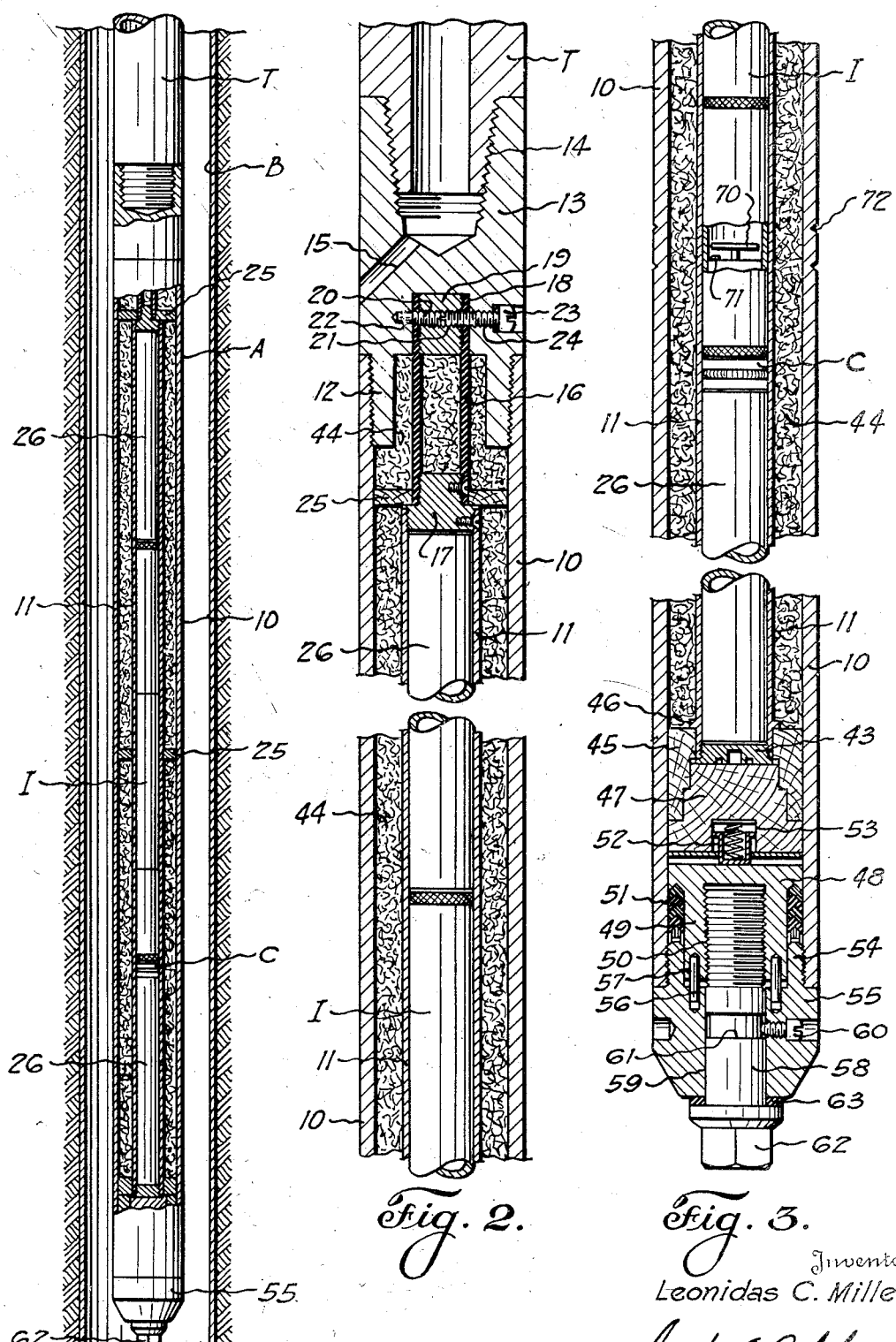
Inventor
Leonidas C. Miller
By Jack A. Ashley
Attorney July 13, 1943. L. C. MILLER 2,324,103
WELL SURVEY APPARATUS
Filed Dec. 19, 1940 2 Sheets-Sheet 2

Inventor
Leonidas C. Miller
By Jack A. Ashley
Attorney

Patented July 13, 1943

2,324,103

UNITED STATES PATENT OFFICE 2,324,103

WELL SURVEY APPARATUS

Leonidas C. Miller, Dallas, Tex., assignor of one-half to Eastman Oil Well Survey Company, Dallas, Tex., a corporation of Delaware, and one-half to Eastman Oil Well Survey Corporation, Long Beach, Calif., a corporation of California Application December 19, 1940, Serial No. 370,823

7 Claims. (Cl. 33—205)

This invention relates to new and useful improvements in well survey apparatus.

One object of the invention is to provide an improved apparatus which is particularly adapted for use in making surveys of a well bore and which is so constructed that the survey instrument is protected against damage by heat occasioned by the extremely high temperatures encountered in the sub-surface formation.

An important object of the invention is to provide an improved well survey apparatus including an insulating barrel within which the survey instrument is mounted, said barrel being arranged to protect the instrument against damage by retarding heat transfer by radiation, conduction and convection, whereby the heat transfer from the well bore to the instrument is minimized and the instrument is maintained sufficiently cool throughout its operation to assure efficient operation.

Another object of the invention is to provide an improved casing or barrel for receiving a well survey instrument and having means for cooling the instrument and also for efficiently insulating said instrument from the relatively high sub-surface temperatures, whereby the photographic film, batteries and other parts of the survey instrument are protected from damage by heat.

Still another object of the invention is to provide an improved insulating barrel for survey instruments having an inner chamber for receiving the instrument and also for receiving the cooling medium and having an outer casing spaced from the inner chamber with an insulating material between said chamber and casing, whereby not only is a heat transfer to the instrument from outside the barrel prevented but, in addition, the instrument is cooled by the cooling medium.

A further object of the invention is to provide an improved insulating barrel, of the character described, which is constructed so as to readily receive the survey instrument and also cooling medium containers, together with an improved means for removably supporting the same within the barrel and for efficiently insulating said parts from outside temperature.

Still another object of the invention is to provide an improved apparatus, of the character described, wherein the instrument is locked against rotation within the insulated barrel, the apparatus having means for determining the azimuthal position of the instrument within the barrel after said instrument is disposed therein, whereby the barrel may be oriented downwardly into the bore and an accurate survey of said bore made by the instrument.

The construction designed to carry out the invention will be hereinafter described together with other features of the invention.

Figure 5:
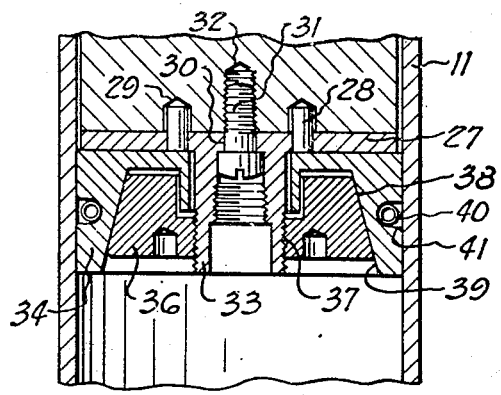
Figure 6:
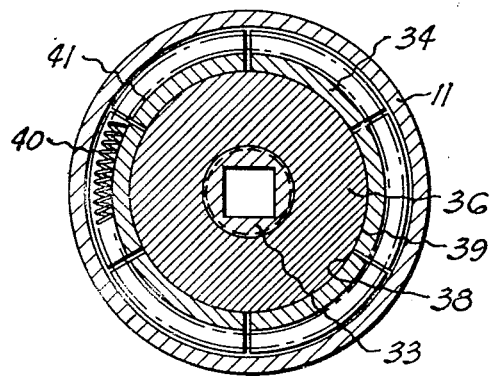
Figure 7:
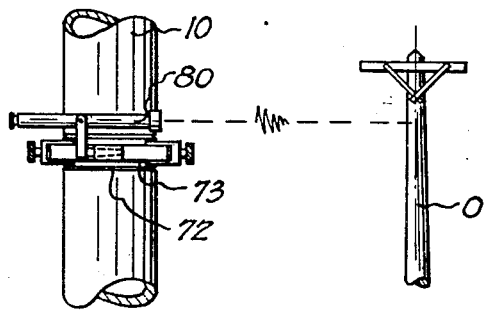
Figure 8:
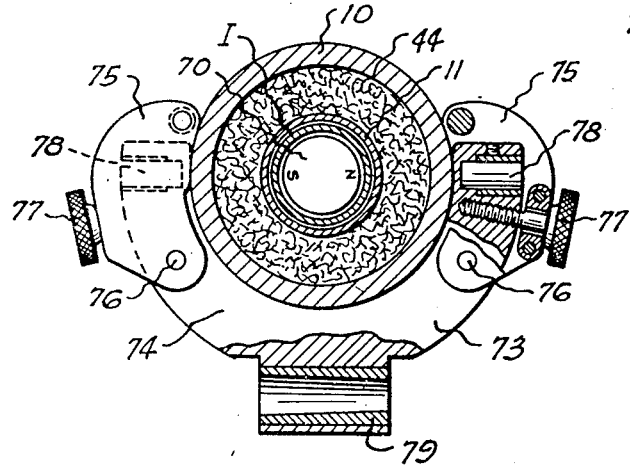
Figure 9:
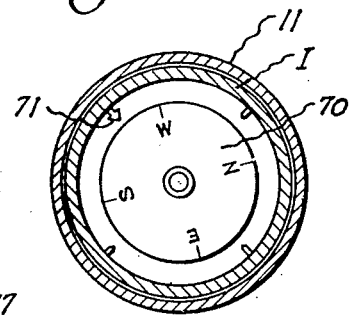

The invention will be more readily understood from a reading of the following specification and by reference to the accompanying drawings, as an example of the invention is shown, and whereof:

Figure 1 is a view, partly in section and partly in elevation of a well survey apparatus, constructed in accordance with the invention, and illustrating a well survey instrument mounted within the insulating barrel, Figure 2 is an enlarged transverse, vertical sectional view of the upper portion of the apparatus, Figure 3 is a view similar to Figure 2 showing the lower portion of said apparatus, Figure 4 is an enlarged transverse vertical sectional view of the locking means for locking the well instrument against rotation within the barrel, the locking means being in a retracted position, Figure 5 is a view similar to Figure 4, with the locking means in a position holding the instrument within the barrel, Figure 6 is a horizontal, cross-sectional view, taken on the line 6—6 of Figure 4, Figure 7 is a partial elevation of the apparatus illustrating an orienting clamp in position on said instrument before the same is lowered within a well bore, Figure 8 is an enlarged view of the clamp, illustrating the barrel and instrument in section and portions of the clamp in elevation, and Figure 9 is a horizontal cross-sectional view taken on the line 9—9 of Figure 3 and illustrating the compass within the well survey instrument.

In the drawings, the letter A designates an elongate cylindrical barrel or housing which is constructed of an outer, cylindrical casing 10 and an inner, co-axial tube or chamber 11. The upper end of the outer casing 10 is threaded onto a depending nipple 12 which is formed integral with a coupling 13. The upper end of the coupling is provided with the usual internally, screw-threaded box 14, whereby the lower end of the well tubing T may be connected thereto. With such arrangement, the barrel or housing A is connected to the lower end of the tubing and may be lowered downwardly through the well bore B by means of said tubing. In order to establish communication between the bore of the tubing and the space outside of the coupling 13, said coupling is provided with an inclined passage 15 which extends radially therethrough, as is clearly shown in Figure 2. The passage 15 permits an equalization of pressure within the bore of the tubing T and also within the well bore B.

Since the outer casing 10 is threaded onto the depending nipple 12 of the coupling 13, said casing is suspended from the coupling. The inner, co-axial tube or chamber 11 is also suspended from the coupling 13 by means of a tubular sleeve 16, which is constructed of "Bakelite" or other insulating material. The sleeve 16 has its lower end threaded onto the upper end of a metallic plug 17, which plug is, in turn, threaded into the upper end of the tube or chamber 11. The upper end of the sleeve 16 is insertable within an axial recess 18 which is formed in the underside of the coupling 13. A plug 19 is also threaded into the extreme upper end of the bore of the connecting sleeve 16 and has a retaining pin 20 threaded within a diametrically extending opening 21 which is formed therein. When the connecting sleeve is inserted within the recess 19 of the coupling, the pin 20 may be screwed inwardly so as to engage within a recess 22 which alines with the opening 21. When the pin 20 is engaged within the recess 22, it is manifest that the connecting sleeve 16 and the inner chamber or tube 11 is held against downward displacement. A capscrew 23 may be inserted in a radial opening 24 provided in the coupling, which opening is alined with the opening 21 within the plug 19, whereby the opening 21 may be closed. If desired, a suitable packing gasket may be confined beneath the head of the capscrew 23.

The inner cylindrical chamber or tube 11 is of considerably less diameter than the diameter of the casing 10 whereby an annular space is provided between the tube and the casing. In order to maintain the tube 11 in axial alinement with the casing 10, a plurality of spacer collars 25 which are preferably constructed of balsa wood surround the inner tube 11 and have their outer peripheries engaging the wall of the casing 10.

The inner chamber or tube 11 is adapted to house a well survey instrument I and is also adapted to receive a pair of tubular ice containers 26 which are disposed one above and one below the instrument I as is clearly shown in Figure 1. The instrument I is clamped or locked against rotation by a clamping element C which is interposed between the lower end of the instrument and the lower cooling container 26.

The clamp C is clearly shown in Figures 4 to 6 and includes a circular supporting plate 27 which is of substantially the same diameter as the diameter of the instrument case. The supporting plate is formed with a pair of upstanding pins 28 which are disposed diametrically opposite each other within said plates and which are adapted to engage recesses 29 which are formed in the bottom of the case of the instrument I. The plate 27 has an axial opening 30 through which a headed bolt 31 is adapted to extend. The bolt 31 is threaded into a socket 32 which is formed in the underside of the instrument case and, manifestly, the bolt serves to fasten the supporting plate 27 to the underside or bottom of the instrument. If desired, the supporting plate could be made integral with the case of the instrument.

A depending collar 33 surrounds the axial opening 30 and extends downwardly from the supporting plate 27. A plurality of locking segments 34 are disposed below the supporting plate and each segment is substantially arcuate in shape. Each segment has its top abutting the underside of the plate 27 and the outer surface of each segment is adapted to engage the wall of the tube 11, as will be explained. The inner end of each segment is provided with a downwardly directed flange 35 which engages the exterior surface of the depending collar 33. An actuating block or wedge 36 is provided with a central screw-threaded opening 37, whereby said block may be threaded onto the lower end of the collar 33. The block or wedge is annular in the form of a collar and has its outer peripheral surface 38 inclined and this inclined surface is complementary to the inner inclined surface 39 of each locking element, whereby the wedge is adapted to co-act with said locking element. The locking elements are normally held inwardly in engagement with the wedge or block 36 by means of a coiled spring 40 which surrounds the locking elements and which is disposed within grooves 41 provided in the outer surfaces of said elements. The spring 40 constantly exerts its pressure to hold the locking elements inwardly and in engagement with the wedge or block 36. The central opening 37 within the block 36 is enlarged as shown at 42 and this enlarged portion of the bore receives the downwardly extending flanges 35 of the locking elements 34.

In assembling the apparatus, the upper cooling container 26 is first inserted within the inner chamber or tube 11, after which the survey instrument I is inserted into the tube so that its upper end abuts or engages the lower end of said container. At such time, the clamp C has its port in the position shown in Figure 4, whereby the locking elements 34 are in a retracted or disengaged position. After the instrument I is properly positioned within the tube 11, the wedge or block 36 is rotated so as to be screwed upwardly relative to the locking elements 34. Such upward movement of the wedge or block 36 causes an outward radial movement of the locking elements due to the co-action between the inclined periphery 38 of the wedge and the inner inclined surfaces 39 of the locking elements. The outward radial movement of the locking elements is against the pressure or tension of the coil spring 40. After the locking elements are moved to the position shown in Figure 5, their outer peripheries engage the bore of the tube 11 and frictionally hold the instrument I against rotation within the tube and also against downward displacement therein. After the instrument is locked within the tube 11, the lower cooling container 26 is inserted, as shown in Figure 1. The lower end of the tube 11 is then closed by a flanged cap or closure 43 which is threaded into the lower end of said tube, as is clearly shown in Figure 3.

The annular space between the tube 11 and the casing 10 is filled with an insulating material, such as glass wool, mineral wool, felt or other suitable material 44. This material is also inserted between the connecting sleeve 16 and the casing 10 above the uppermost spacing collar 25, whereby the entire space between the inner chamber or tube 11 and the casing is filled. The insulating material 44 is retained within the annular space by means of an annular retaining element 45, which element surrounds the lower end of the tube 11 and engages beneath an annular flange 46 formed on the tube 11. The bore of the retaining element 45 is provided with offsets or shoulders which are arranged to co-act with a shouldered plug or head 47, the latter being insertable within the bore of the retaining element. Both the plug 47 and the retaining element 45 are preferably constructed of balsa wood or other material which is non-heat-conducting. The plug 47 is retained in position within the casing 10 by means of a combined packing and closure element 48 which is secured within the lower end of the casing 10.

The packing and closure element 48 includes an inner sleeve 49 which is formed with an axial screw-threaded bore 50. A plurality of V-shaped packing rings 51 are mounted on the outer surface of the sleeve 49 and are adapted to seal off the space between said sleeve and the bore of the casing 10. The upper end of the sleeve engages a spring-pressed hollow pin 52 which is disposed within a recess 53 formed in the lower end of the plug 47 and, manifestly, the spring within this pin serves to hold the plug 47 upwardly in engagement with the shoulders of the retaining element 45 at all times.

The packing rings 51 which are mounted on the sleeve 49 of the element 48 are retained on said sleeve by an upwardly extending collar 54 which is formed on the upper end of a closure cap 55. The collar 54 is threaded into the lower end of the casing 10 and has its upper end engaging the packing rings 51. The cap 55 is provided with upstanding pins 56 which engage within recesses 57 in the lower end of the sleeve 49, whereby the cap 55 and the sleeve 49 are rotatable as a unit. Although the cap 55 cannot be rotated independently on the sleeve 49, the pins 56 permit a limited vertical movement of said cap with relation to the sleeve 49.

To control the independent vertical movement of the cap 55 with relation to the sleeve 49, an elongate bolt 58 extends through an axial bore 59 provided in the cap and has its upper end threaded into the screw-threaded bore 50 of the sleeve 49. Longitudinal movement of the bolt 58 within the cap 55 is prevented by a set screw 60 which is threaded through a radial opening in the cap and which engages an annular groove 61 formed in the shank of the bolt 58. The extreme lower end of the bolt is formed with a wrench head 62 and a suitable ring 63 is interposed between the head 62 and the bottom of the cap 55.

In assembling the device for use, the packing and closure element 48 is removed, as is the plug 47 and the closure 43 for the tube 11. It is, of course, presumed that the tube or chamber 11 is empty. At this time, the insulating material is between the tube 11 and the casing and the various spacer collars 25, as well as the insulating material retaining element 45, are in position as described. The uppermost cooling container 26 which preferably contains ice is first inserted within the tube 11, after which the survey instrument I is inserted within the tube. This instrument has the clamp C associated with its lower end and said clamp is operated by rotating the wedge or block 36 thereon to expand the locking elements 34 into a frictional engagement with the wall of the tube, whereby the instrument is locked against rotation within the tube and is also locked against displacement therein. The lower cooling container 26, which also contains ice, is then inserted in the lower end of the tube below the instrument I and the closure 43 is threaded into the bottom of said tube so as to retain the elements within said tube.

After the cooling containers and instrument have been introduced into the tube or chamber 11, the insulating plug 47 is placed in position within the casing. The packing and closure element 48 is then inserted within the lower end of the casing and the cap 55 rotated so as to thread the collar 54 into said casing. After the cap has been rotated until it abuts or engages the extreme lower edge of the casing 10, a rotation is imparted to the bolt 58. Since the sleeve 49 is pinned to the cap 55 and is incapable of rotation, a rotation of the bolt 58 will cause a longitudinal movement of the sleeve 49 with relation to the cap and also with relation to the casing. The bolt 58 is rotated in a direction to move the sleeve 49 downwardly toward the cap 55, whereby the packing rings 51 are distorted into a tight sealing engagement with the wall of the casing 10 and the outer surface of the sleeve 49. The downward movement of the sleeve 49 which results in a distortion of the packing rings does not affect the position of the plug 47 due to the fact that the spring-pressed pin 52 follows said sleeve, the plug 47 remaining in its proper position. With this arrangement, it will be manifest that the packing and closure element 48 may be placed within the casing 10, with the packing rings 41 in an undistorted or non-sealing position. After the cap has been screwed into the casing, the bolt 58 may be manipulated to compress the packing between the shoulder at the upper end of the sleeve 49 and the upper end of the collar 54.

The casing 10 and the tube 11 are preferably constructed of copper or other similar material having a high specific heat value together with high heat conductivity. Such a material will absorb more heat and will retard the speed or rate of temperature rise. It is also preferable that the tube 11 have its exterior surface highly polished so that radiation is reduced due to reflection. It will be manifest that the arrangement above described will efficiently protect the instrument I from damage by heat. The insulating material also reduces heat transfer by convection since it minimizes a circulation of air between the inner and outer casing. The cooling containers 26, as has been described, preferably contain ice and obviously serve to cool the inner chamber 11 and the instrument I which is housed therein. The presence of the cooling chambers, together with the provision of the insulating material prevents the instrument from being damaged due to excessive heat. As is well known, the usual survey instruments contain batteries, photographic film and other elements which might be rendered inoperative by excessive heat and the insulated barrel described herein efficiently protects the instrument against the high sub-surface temperatures which are encountered within a well bore.

In making a well survey with the apparatus above set forth, it is desirable to know the position of the instrument I within the barrel so that the photographs which are obtained by the instrument may be properly interpreted as to direction or azimuthal position. Various means might be employed for determining the position in which the instrument I is locked within the tube 11 but in Figures 7 to 9 a simple arrangement for obtaining this information is shown. As explained, the instrument is locked in a fixed position within the tube 11. The instrument includes the usual magnetic compass 70 having a compass "card" and immediately adjacent the compass card a plurality of inwardly directed lugs 71 are provided with the instrument case. The lugs are positioned so that they will appear in the picture or photograph taken by the camera unit (not shown) of the instrument. The outer surface of the casing 10 is provided with a plurality of recesses 72 which are located substantially opposite the compass 70 within the instrument. A clamp 73 which includes a main body 74 and a pair of hinged yokes 75 at each end is adapted to be clamped around the casing 10, the yokes 75 being arranged to engage within the recesses 72 provided in the casing. As is clearly shown in Figure 8, each yoke is pivoted at 76 to the clamp body 74 and is adapted to be moved radially of the casing 10 by means of an adjusting screw 77. The clamp body 74 carries a pair of magnets 78 which, when the clamp is engaged around the casing 10, are disposed diametrically opposite each other and in substantial horizontal alinement with the compass. When the clamp is in position, the magnets 78 cause the compass to rotate to a position alining the North-South poles of the compass with the magnets 78. The clamp body 74 carries a collar 79 which is preferably integral therewith and which is adapted to receive a telescope 80.

Before the device is lowered into the well bore, the clamp 73 is engaged around the casing 10 and the telescope 80 is inserted within the supporting collar 79. The positioning of the clamp around the casing has caused the poles of the compass to aline with the magnets 78 and thus, by citing a distant object O (Figure 7) through the telescope 80, the magnets 78 may be directed in a known azimuthal direction, whereby the poles of the compass may also be directed in such direction. A photograph is then taken of the compass cord and such photograph will show the relation of the poles on the compass relative to the inwardly directed lugs 71 of the instrument case. Since the direction or azimuthal positions of the north pole of the compass is known, the azimuthal positions of the lugs 71 may be determined, with the result that the position of the instrument within the tube 11 may be ascertained. After this initial photograph is taken, the well tubing T may be oriented downwardly within the well bore B by any of the well known orienting methods. After the instrument is lowered into the bore, additional photographs are taken in making the well survey and the position of the instrument with relation to true north is known at all times. It is pointed out that the method of determining the azimuthal position of the instrument, as shown in Figures 7 to 9 has been found suitable, but other methods may be employed.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. A protective housing for well survey instruments including, an outer casing, an inner co-axial casing, a coupling element having the upper ends of said casings secured thereto, whereby said element closes said upper ends and also whereby the casings are suspended therefrom, heat insulating material between the casings, a cooling container insertable within the inner casing which casing is also adapted to receive the well survey instrument, a closure for closing the lower end of the inner casing, and a packing and closure element removably secured in the lower end of the outer casing for closing and sealing the same.

2. A protective housing for well survey instruments including, an outer casing, an inner co-axial casing, a coupling element having the upper ends of said casings secured thereto, whereby said element closes said upper ends and also whereby the casings are suspended therefrom, heat insulating material between the casings, a cooling container insertable within the inner casing which casing is also adapted to receive the well survey instrument, a heat insulating plug insertable within the outer casing below the inner casing, and a closure threaded into said outer casing for retaining said plug in position therein.

3. A protective housing for well survey instruments including, an outer casing, an inner co-axial casing, a coupling element having the upper ends of said casings secured thereto, whereby said element closes said upper ends and also whereby the casings are suspended therefrom, heat insulating material between the casings, a cooling container insertable within the inner casing which casing is also adapted to receive the well survey instrument, a heat insulating plug insertable within the outer casing below the inner casing, a closure threaded into said outer casing for retaining said plug in position therein, and packing means mounted on the closure for the outer casing for sealing the casing to prevent entrance of fluid into the casings.

4. A protective housing for well survey instruments including, an outer casing, an inner co-axial casing, a coupling element having the upper ends of said casings secured thereto, whereby said element closes said upper ends and also whereby the casings are suspended therefrom, heat insulating material between the casings, a cooling container insertable within the inner casing which casing is also adapted to receive the well survey instrument, a heat insulating plug insertable within the outer casing below the inner casing, a closure threaded into said outer casing for retaining said plug in position therein, packing means mounted on the closure for the outer casing for sealing the casing to prevent entrance of fluid into the casings, and means on said last-named closure for mechanically distorting said packing into sealing position after the closure has been threaded into the casing.

5. A well survey apparatus including, an elongate housing formed of co-axial casings having an annular space therebetween, heat insulating material within said space, a well survey instrument adapted to be inserted within the inner casing of said housing, locking means connected with the lower end of the instrument for locking the instrument against rotation within said casing, and cooling means also mounted within said inner casing, whereby the instrument is protected from high sub-surface temperatures when the apparatus is lowered within a well bore.

6. A device, of the character described, including, an elongate housing formed of an outer casing and a co-axial inner casing, heat insulating material between the casings, cooling containers within said inner casing, said inner casing also receiving a well survey instrument which is removably supported therein, locking means connected with the lower end of the instrument for locking the instrument against rotation within said casing, and a removable closure for closing the lower end of the housing.

7. A well survey apparatus including, an elongate outer housing, a coupling having the upper end of said housing threaded thereinto and closing said upper end, an inner casing extending co-axially within said housing and having its upper end connected with and supported by the coupling, said inner casing terminating at a point above the lower end of the housing, heat insulating material completely filling the annular space between the casing and housing, a cooling container within the inner casing, said casing also receiving a well survey instrument, a closure for the inner casing, and a separate closure for the outer housing.

LEONIDAS C. MILLER.